US007806253B2

(12) United States Patent
Graswinckel et al.

(10) Patent No.: US 7,806,253 B2
(45) Date of Patent: Oct. 5, 2010

(54) APPARATUS AND METHOD FOR STEERING A BELT

(75) Inventors: Julius V. C. Graswinckel, Arcen (NL); Jan P. J. Verstegen, Sevenum (NL); Peter J. Hollands, Baarlo (NL); Gerardus J. C. Van Soest, Bergen (NL); Kevin H. J. R. Prinsen, Hamont (BE)

(73) Assignee: Oce-Technologies B.V., Venlo (NL)

( * ) Notice: Subject to any disclaimer, the term of this patent is extended or adjusted under 35 U.S.C. 154(b) by 14 days.

(21) Appl. No.: 12/285,325

(22) Filed: Oct. 1, 2008

(65) Prior Publication Data

US 2009/0084661 A1 Apr. 2, 2009

(30) Foreign Application Priority Data

Oct. 2, 2007 (EP) ................................ 07117725

(51) Int. Cl.
*B65G 39/16* (2006.01)

(52) U.S. Cl. ...................................... 198/806; 474/107

(58) Field of Classification Search ................. 198/806, 198/807; 474/106, 107
See application file for complete search history.

(56) References Cited

U.S. PATENT DOCUMENTS

| | | | | |
|---|---|---|---|---|
| 994,910 | A * | 6/1911 | Duesterhoff | 474/107 |
| 1,842,946 | A * | 1/1932 | Prins | 474/106 |
| 1,846,665 | A * | 2/1932 | Adams | 474/107 |
| 2,342,863 | A * | 2/1944 | Hlavaty | 474/106 |
| 2,344,817 | A * | 3/1944 | Hlavaty | 474/103 |
| 3,435,693 | A | 4/1969 | Wright et al. | |
| 4,286,706 | A * | 9/1981 | Castelli et al. | 198/806 |
| 4,607,947 | A | 8/1986 | Ensing et al. | |
| 7,058,345 | B2 * | 6/2006 | Abe et al. | 399/303 |

FOREIGN PATENT DOCUMENTS

| | | | |
|---|---|---|---|
| EP | 0 458 260 | A2 | 11/1991 |
| JP | 6-64773 | A | 3/1994 |

* cited by examiner

*Primary Examiner*—Mark A Deuble
(74) *Attorney, Agent, or Firm*—Birch, Stewart, Kolasch & Birch, LLP

(57) ABSTRACT

An apparatus for steering a belt includes a steering roller supporting the belt, a rotatable element and a transmission. The steering roller is rotatable about a first axis and pivotable about a second axis, the second axis being substantial perpendicular to the first axis. The rotatable element is rotatable about a third axis, the third axis being parallel to the first axis. The transmission is arranged for converting a rotational motion of the rotatable element about the third axis into a pivoting motion of the steering roller about the second axis. The rotatable element is rotatable by a frictional force between a side portion of the belt and the rotatable element. A method for steering a belt in a steering mechanism includes such an apparatus.

14 Claims, 5 Drawing Sheets

APPARATUS AND METHOD FOR STEERING A BELT

CROSS-REFERENCE TO RELATED APPLICATIONS

This application claims priority under 35 U.S.C. §119(a) to Application No. 07117725.7, filed in Europe on Oct. 2, 2007, the entirety of which is expressly incorporated herein by reference.

BACKGROUND OF THE INVENTION

1. Field of the Invention

The present invention relates to an apparatus for steering a belt including a steering roller supporting the belt, a rotatable element and a transmission. The steering roller is rotatable about a first axis and pivotable about a second axis, the second axis being substantial perpendicular to the first axis. The rotatable element is rotatable about a third axis, the third axis being parallel to the first axis. The transmission is arranged for converting a rotational motion of the rotatable element about the third axis into a pivoting motion of the steering roller about the second axis. The rotatable element is rotatable by a frictional force between a side portion of the belt and the rotatable element.

2. Description of Background Art

An apparatus of this kind is known from EP 0 458 260. In this patent, a belt driving system having at least one roller for adjusting creep within a plurality of rollers is disclosed. The belt driving system disclosed in EP 0 458 260 includes: a creep detecting means provided at one end of the creep adjusting roller which is rotated by torque of a flat belt in contact with the creep detecting means; a biasing means for biasing the flat belt towards the creep detecting means; and a roller-end displacing means for converting the torque of the creep detecting means into a displacement of the end of the creep adjusting roller towards a predetermined direction so that the flat belt is moved to the direction contrary to the creep caused by the biasing means. When the flat belt creeps, the creep contrary to the original creep is caused by the roller-end displacing means, and thus the original creep is compensated. Consequently, stable running of the flat belt is obtained.

Although the apparatus known from the cited reference enables steering of a belt to its desired path, it has the disadvantage that relatively large steering forces and hence large frictional forces between the rotatable element and the side portion of the running belt are required to operate the steering mechanism. The construction of the steering mechanism disclosed in EP 0 458 260 is such that a relatively large contact area between the rotatable element, which is the creep detection means in the cited reference, and a surface area of the belt is required to provide for the steering force to obtain stable running of the belt. A large contact area between the rotatable element and the belt increases the risk of damaging the belt during operation.

Practice has shown that, unlike for relatively long belts, the running path of relatively short belts is extremely sensitive towards torsion of the frame that holds the rollers that support the belt. Long belts can easily be steered by passive steering flanges (fixed non-rotatable elements that restrict lateral displacement of the belt). Therefore, short belts cannot be steered in this way. Short belts run off the rollers and get damaged beyond repair.

SUMMARY OF THE INVENTION

It is an object of the present invention to obviate the above-mentioned disadvantage by providing an apparatus having a transmission including a rotatable portion, operatively connected to the rotatable element and having a diameter smaller than the diameter of the steering roller.

The transmission in the apparatus according to the present invention offers a gear ratio (gr), which is the ratio between the radius of the steering roller ($R_2$) and the radius of the rotatable portion of the transmission ($R_1$). The rotatable portion of the transmission may be of any shape, for example a cylindrically shaped shaft or a gear wheel, as long as its radial dimension is smaller than the radius of the steering roller.

The steering force $F_s$ is proportional to the frictional force $F_f$ between the rotatable element and a side portion of the belt, the proportionality factor being the gear ratio (gr):

$$F_s = F_f \cdot \frac{R_2}{R_1} = F_f \cdot gr$$

It is recognized that the required frictional force can be reduced by increasing the gear ratio. The required contact surface area between the rotatable element and a surface of the belt can be reduced to a large extent, even such that only the lateral end side of the belt suffices. Contact between the rotatable element and the inside surface area of the belt is no longer required for steering the belt.

Another advantage of the present invention is that the lateral distance between the rotatable element and the steering roller is minimized and constant, so the belt is sufficiently supported at all times during operation, which limits the risk of buckling of the belt. Rotation of the rotatable element is induced by frictional forces upon contact with a side portion of the belt. Small lateral deviations from the desired path of the belt are corrected and the path of the belt is accurately controlled within a narrow range of lateral positions, with very small forces exercised by the belt on the rotatable element.

An additional advantage of the present invention is that the mechanism is simple and compact.

In an embodiment, the rotatable element is a freely rotatable element. The freely rotatable element is rotatable about the third axis, independently from the rotation of the steering roller about the first axis. Rotation of the freely rotatable element is induced by a frictional force between a side portion of the belt and the freely rotatable element, if the belt touches the rotatable element.

In an embodiment, the first axis and the third axis coincide, such that the rotatable element and the steering roller are axially aligned. This configuration has the advantage that it enables a relatively simple and compact transfer mechanism for transferring the rotational motion of the rotatable element into a pivoting motion of the steering roller.

In an embodiment, the dimension of at least a portion of the rotatable element extending from the third axis to the perimeter of the rotatable element, perpendicular to the third axis, exceeds the radius of the steering roller. This arrangement enables contact between a side portion of the belt and the rotatable element. It is recognized that a simple representation of the above-described rotatable element is a circular flange, having a diameter that is larger than the diameter of the steering roller and having coinciding first and third axes.

In an embodiment, the rotatable element is arranged at a first axial end portion of the steering roller. The rotatable element and the steering roller are axially aligned. This arrangement provides a fully supported belt (supported by the steering roller) that upon contact with the freely rotatable element is able to induce a relatively large torque with a small frictional force without the risk of buckling of the belt.

In a further embodiment, the transmission is arranged at the first axial end portion of the steering roller, such that the transmission and the rotatable element are located at the same side of the steering roller. This arrangement keeps the transmission compact and simple.

In another embodiment, the transmission is arranged at a second opposite axial end portion of the steering roller. In this embodiment the rotational motion of the rotatable element induced upon contact with the side portion of the belt, is transmitted via a shaft extending through the center of the steering roller to the transmission. The transmission, which is provided at the end of the shaft opposite to the end at which the rotatable element is provided, enables the transmission of the rotational motion of the rotatable element into a pivoting motion of the steering roller about the second axis, such that the belt is steered to its preferred lateral position. Although leading to a somewhat more complex transmission, this arrangement has the advantage that the steering action is less sensitive towards small variations in the frictional force between the side portion of the belt and the freely rotatable element. The reason for this is that the steering action is exerted at the end portion opposite to the freely rotatable element, which results in a small motion of the freely rotatable element, because it is arranged closely to the pivot point.

In an embodiment, a device for applying a pre-tension (pre-tension mechanism) is present, which induces a pivoting motion of the steering roller about the second axis in a direction opposite to the direction in which the steering roller is pivotable by the transmission, induced by the frictional force between the side portion of the belt and the rotatable element.

The pre-tension may be applied by a spring, by a gravitational force induced by the weight of the steering roller or by the tension within the belt itself. It must; however, be noted that the embodiment of the pre-tension mechanism is not limited to the examples above. The pre-tension mechanism has the purpose of steering the belt towards the rotatable element.

In an embodiment, the transmission includes a gear wheel connected to the rotatable element and a gear rack, the gear rack being arranged such that the steering roller is pivotable about the second axis, possibly by arranging the gear rack at an angle ($\alpha$) with respect to the second axis, the angle being between and including 0° and 90°, preferably between and including 0° and 45°, most preferably between and including 0° and 10°.

The gear wheel is connected through a shaft with the rotatable element. If the side portion of the belt, closest to the rotatable element, touches the rotatable element, a frictional force between the side portion of the belt and the rotatable element will induce a rotational motion of the rotatable element and hence the gear wheel. The gear wheel, which grabs hold of the gear rack, runs on the gear rack and hence tilts the steering roller about the second axis. The required frictional force depends on the gear ratio (gr), which is the ratio between the radius of the steering roller ($R_2$) and the radius of the gear wheel ($R_1$). It is recognized that the required frictional force can be reduced by increasing the gear ratio.

In an embodiment the transmission includes a coiling device arranged such that the steering roller is pivotable about the second axis. When the rotatable element is rotated by a frictional force as previously described, one end of the coiling device coils around the axle of the rotatable element while the other end is fixed. The end portion on which the coiling device coils, runs over a sloped sliding plane and tilts the steering roller about the second axis. In a further embodiment, the coiling device includes an elongated flexible member. In a further embodiment, the elongated flexible member is selected from the group comprising ribbon, chain, thread and string. These embodiments have the advantage that a larger gear ratio is possible, because no gear wheel is required. Therefore, $R_1$ is the radius of the shaft, which can be chosen much smaller. Furthermore, practice has shown that these arrangements run very smoothly.

Another aspect of the present invention relates to an imaging system including an apparatus for steering a belt according to any one of the preceding embodiments. The apparatus of the present invention finds its application in all kinds of imaging systems in which transport belts need to be accurately controlled into a well-defined path. The imaging system may include, but is not limited to, a fax, a printer, a copier or a scanner.

Another aspect of the present invention relates to a method for steering a belt in a steering mechanism including an apparatus as described above. The method includes the steps of advancing the belt over the steering roller, inducing a rotational motion of the rotatable element and pivoting the steering roller about the second axis, via the transmission, such that the belt is steered to an equilibrium lateral position.

Small deviations in the alignment of the supporting rollers may cause the belt to drift sideways (lateral movement). The arrangement of the apparatus of the present invention is such that the belt always drifts laterally towards a predefined side, the side at which the rotatable element is arranged. When the side portion of the belt touches the freely rotatable element, frictional forces between the side portion of the belt and the freely rotatable element cause the freely rotatable element to rotate. This rotational motion about the third axis is transformed into a pivoting motion of the steering roller about the second axis by means of a transmission. The steering roller is tilted such that the belt is steered in a lateral opposite direction. This in turn causes the frictional force between the side portion of the belt and the freely rotatable element and hence the steering force to decrease. The belt is steered to an equilibrium lateral position, at which the steering force and counteracting forces (e.g. belt tension, gravitation, pre-tension) are equal.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
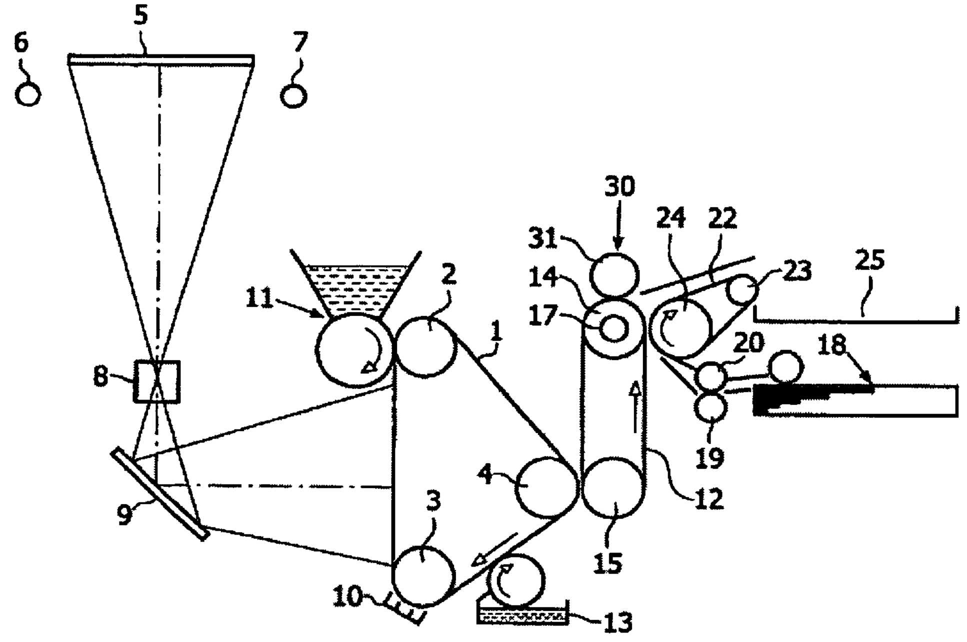
FIG. 1 is a schematic representation of a printer in which the apparatus of the present invention operates.

The present invention will now be described with reference to the accompanying drawings, wherein the same reference numerals have been used to identify the same or similar elements throughout the several views.

FIG. 1

FIG. 1 diagrammatically indicates a printer in which one or more apparatus for steering a belt according to the present invention are present. The printer is provided with a unit for forming a toner image, the unit including an endless photoconductive belt 1. This belt is rotated in the indicated direction at a uniform speed using drive and guide rollers 2, 3 and 4. In the embodiment illustrated, the printer includes an analogue device in order to project onto the photoconductor 1, using flash lights 6 and 7, lens 8 and mirror 9, and an image of an original (not shown) placed on the easel 5. Prior to this imaging, the photoconductor is electrostatically charged by means of a corona unit 10. The optical imaging of the original on the charged photoconductor results in the formation of a latent charge image on the conductor, as is adequately known from the background art. This charge image is developed with toner powder transferred to the photoconductor with the use of a developing unit 11, including a magnetic brush. This results in the formation of a toner image on the photoconductor. In a first transfer zone, the image is brought into contact under pressure with an endless intermediate belt 12, which is trained around the rollers 15 and 14 under tension. As a result of the contact in the first transfer zone, which takes place at a temperature of typically 40° C. to 70° C., the toner image is transferred from the photoconductor 1 to the intermediate belt 12. After this transfer, any remaining toner particles are removed from the photoconductor 1 using a cleaner roller 13. The photoconductor is then ready for re-use. The intermediate belt 12 is trained under tension over the rollers 14 and 15, the image being passed from the first transfer zone to a second transfer zone where the intermediate belt 12 is in contact with a pressure-application belt 22. Belt 22 is trained over rollers 23 and 24. Roller 24 is placed under pressure in the direction of belt 12. In the transfer zone, a receiving material (not shown) originating from tray 18 and guided by rollers 19 and 20, is brought into contact with the intermediate belt 12, the receiving material being so guided that it is situated in register with the toner image on the intermediate belt 12. At the second transfer zone, the temperature of the intermediate belt is such, by the use of heating element 17, that the toner particles are to some extent tacky and readily deformable. As a result of this also, the toner particles transfer from the intermediate belt 12 to the receiving material and are also rigidly combined with said material. After the image has been transferred, the printed receiving material is deposited in the output tray 25 intended for the purpose. Any residue of toner particles on the intermediate belt are removed by the use of a cleaner roller 30, which has a surface 31 that picks up toner particles. A roller of this kind is known, for example, from U.S. Pat. No. 4,607,947. The printer of this example is provided with an analogue device in order to image an original on the photoconductor. It should be clear that other means than those illustrated, for example a digital device, which can use a page-width printhead provided with light emitting diodes (LED's) may be suitable for creating a charge image on the photoconductor. Also, an image-forming unit using a photoconductor may be dispensed with. The important feature is that an image is formed and that this image is transferred in any way whatsoever to the intermediate belt. In the example illustrated, there is only one intermediate belt 12. It is obvious that use can also be made of a plurality of intermediate belts or other devices, in addition to the intermediate belt, to transfer images in order finally to transfer the image to the receiving material. The form of transfer of the image as illustrated, by means of contact transfer, is one of the many possibilities. Other techniques are possible, for example contactless techniques, in which the particles are transferred by the use of an electric field.

The apparatus of the present invention may be used in all belt types, e.g. organic photo conductor belt 1, intermediate belt 12, a pressure-application belt 22 and a media transport belt.

FIG. 2

Figure 2:
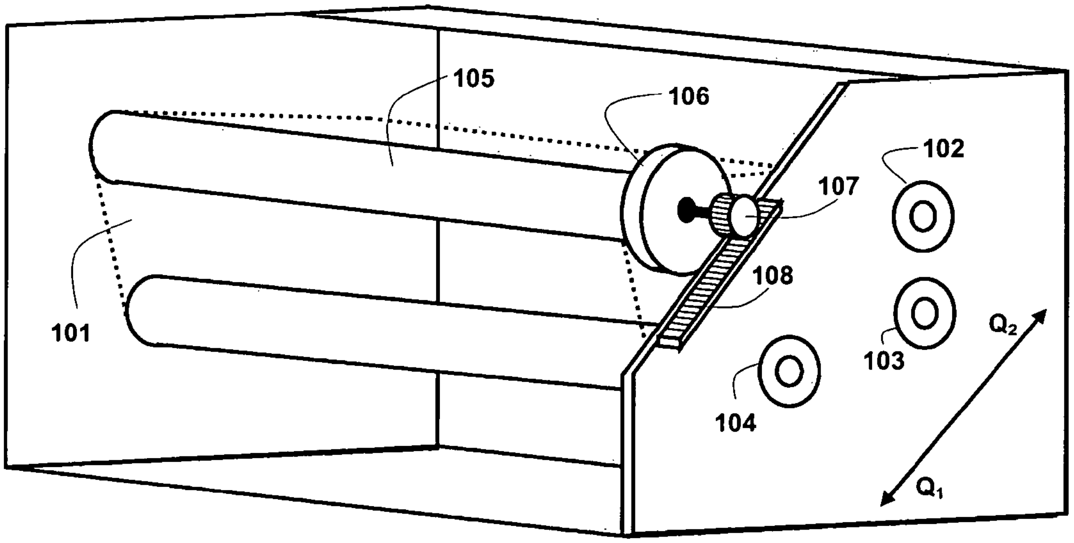
FIG. 2 is a schematic representation of an embodiment of the present invention.

FIG. 2 diagrammatically shows an embodiment of the present invention. A flexible belt 101 is trained over three supporting rollers 102, 103, 104 and one steering roller 105. At a first axial end portion of the steering roller a freely rotatable circular flange 106 is attached. A transmission including a gear wheel 107 and a gear rack 108 is also attached at the first axial end portion of the steering roller 105.

Primarily, the belt tension forces the first axial end portion of the steering roller in the $Q_1$ direction (double arrow in FIG. 2, parallel to the gear rack), causing the belt to run towards the circular flange. This effect can be enhanced by a pre-tension (e.g. a spring) and/or gravitation (dependent on the orientation of the apparatus). The total force causing the first axial end portion of the steering roller in the $Q_1$ direction is not limited to, but possibly a combination of the above mentioned forces and further indicated with $F_t$.

When the side portion of the belt 101 touches the flange 106, a frictional force between the side portion of the belt and the flange induces a rotational motion of the flange. Instantaneously, the gear wheel is set in motion and it runs along a sloped sliding plane of the gear rack in the $Q_2$ direction, tilting the steering roller about the second axis and steering the belt back to its desired path. Hence, the frictional force decreases, causing the influence of $F_t$ to increase. At a certain $F_t$, the first axial end portion of the steering roller is forced in the $Q_1$ direction again. Eventually an equilibrium situation will be reached wherein the frictional forces are balanced by counteracting forces (e.g. belt tension, gravitation, applied pretension). In practice the frictional forces do not inflict significant damage to the belt.

FIG. 3

Figure 3:
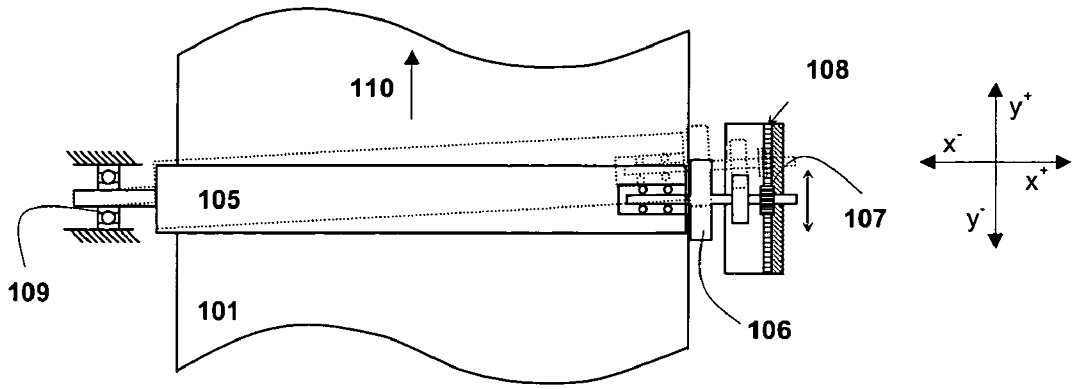
FIG. 3 is a schematic representation of the top view of the embodiment in FIG. 2.

FIG. 3 schematically shows the arrangement of the freely rotatable flange 106, the gear wheel 107 and the gear rack 108. FIG. 3 also clearly shows the ability of the steering roller being rotatable about the first axis and pivotable about the second axis (the position of the steering roller after it is being steered is indicated by the dotted line image). For the latter a movable joint 109 is provided.

As the belt advances in the positive y-direction, as indicated by arrow 110, the belt tends to move laterally towards the freely rotatable flange 106, in the positive x direction. There are various causes for this lateral movement. For example, if the rollers that support the belt are imperfectly aligned in the axial direction, the torsion will cause the belt to 'walk off' in a lateral direction. An uneven tension distribution in the belt may also be a cause for the lateral movement of the belt.

The rollers (102, 103, 104 and 105) of the apparatus of the present invention may be intentionally misaligned, to make sure that the belt 101 is steered towards the freely rotatable flange 106.

If the side portion of the moving belt 101 touches the freely rotatable flange 106, the flange starts to rotate, induced by a frictional force between the side portion of the belt and the flange. The gear wheel 107 starts to run over the gear rack 108 in the positive y-direction and positive z-direction (out of the plane, not shown in FIG. 3, see FIG. 2), pivoting the steering roller 105 about the second axis. The belt is steered in the negative x-direction, away from the flange. Eventually an equilibrium path will be reached, determined by an equilibrium between forces that steer the belt towards the flange (e.g. tension in the belt, gravity forces induced by the weight of the steering roller, applied pre-tension and the like) and the steering force induced by the frictional force between the side portion of the belt and the freely rotatable flange.

FIG. 4

Figure 4:
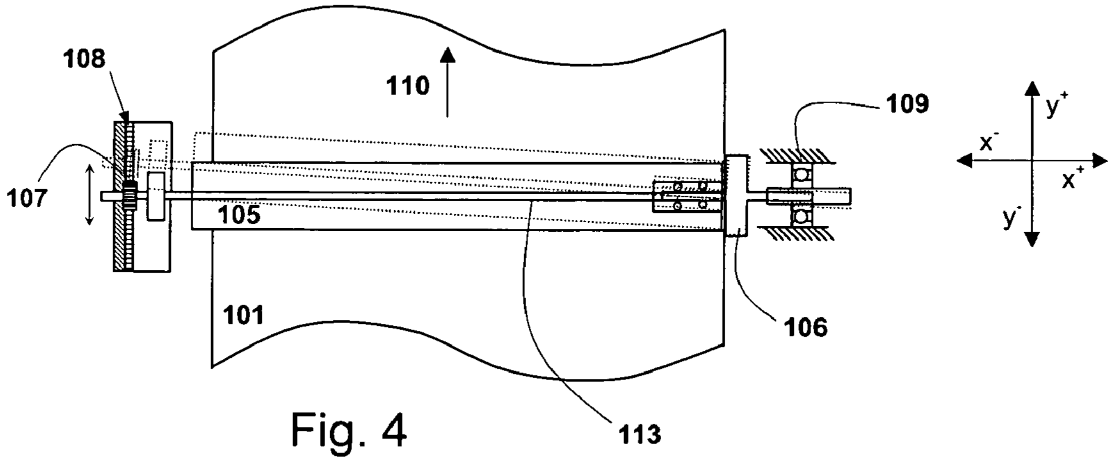
FIG. 4 is a schematic representation of another embodiment of the present invention.

FIG. 4 schematically shows another arrangement of the freely rotatable flange 106, the gear wheel 107 and the gear rack 108. The freely rotatable flange 106 and the gear wheel are arranged at opposite ends of a shaft 113 that extends in a direction parallel to the first axis through the center of the steering roller. The movable joint 109 is arranged at the same side as the freely rotatable flange to enable a pivoting motion of the steering roller 105 about the second axis. The position of the steering roller after it is being steered is indicated by the dotted line image.

The steering mechanism basically operates in the same way as the mechanism shown in FIG. 3. However, the rotation of the freely rotatable flange is transmitted via the shaft 113 through the center of the steering roller 105 to the gear wheel 107 arranged at the other end of the steering roller 105. The gear rack 108 is arranged such that the belt is steered back to its desired lateral position. In this example, the gear rack is arranged above the gear wheel with a negative slope in the positive y-direction and upside down, i.e. the toothed side directed downwards towards the gear wheel. This means that the gear wheel 107 engages with the gear rack 108 in the negative y-direction and positive z-direction, i.e. the outward direction with respect to the plane of the paper, pivoting the steering roller 105 about the second axis. The belt is steered in the negative x-direction, away from the flange. Eventually an equilibrium path will be reached.

FIG. 5

Figure 5:
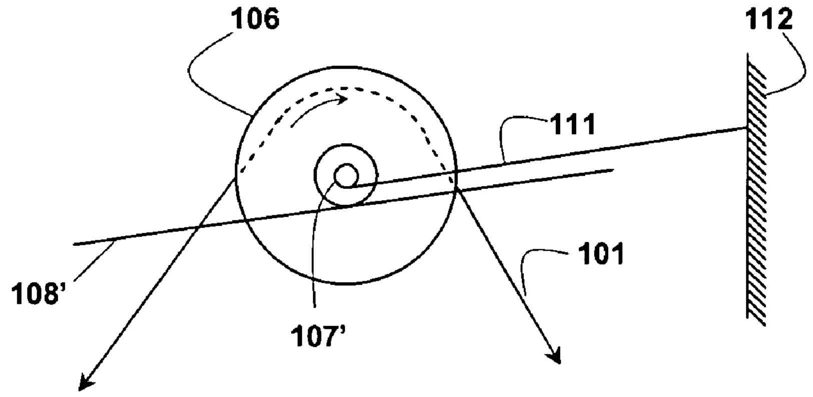
FIG. 5 is a schematic representation of another embodiment of the present invention.

FIG. 5 schematically shows a representation of another embodiment of the present invention, which is a coiling device. The basic operation of this embodiment of the apparatus of the present invention is the same as previously explained based on FIGS. 2 and 3. In this embodiment; however, the transmission includes an axle 107' instead of a gear wheel, a smooth sliding slope 108' instead of a gear rack and additionally a coiling device 111. One end of the coiling device is attached to the axle 107', the other end of the coiling device is attached to a fixed wall 112 (e.g. a frame holding the steering mechanism, see FIG. 2).

If the side portion of the belt 101 touches the freely rotatable flange 106, a frictional force between the side portion of the belt 101 and the freely rotatable flange induces rotation of the flange. This rotational motion induces coiling of the coiling device 111 around the axle 107'. Finally, the steering roller is pivoted about the second axis in order to steer the belt to its desired lateral position.

This embodiment has the possible additional feature of a decreasing gear ratio during the steering action. If, for example, the coiling device includes a ribbon with a thickness $d_{ribbon}$ as an elongated flexible member, the radius of the axle 107' increases with $d_{ribbon}$ after a complete revolution of the axle. This causes the gear ratio to decrease upon every revolution of the axle which in turn causes the sensitivity of the steering mechanism to decrease.

FIG. 6

Figure 6:
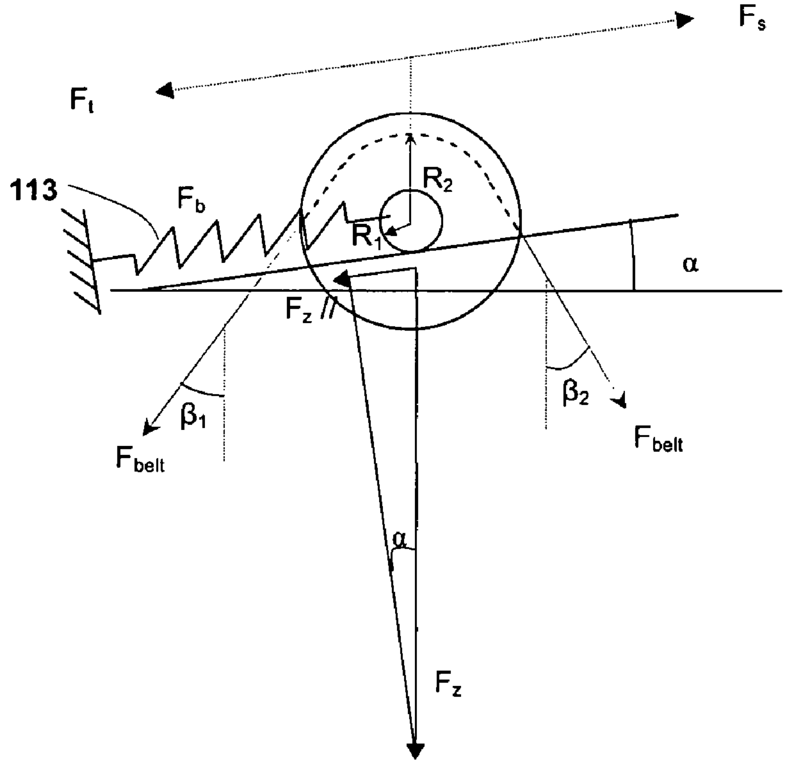
FIG. 6 shows a schematic of a force balance in the steering mechanism.

FIG. 6 schematically shows a side view of an embodiment of the steering mechanism according to the present invention. FIG. 6 also shows the transmission of forces from the side portion of the belt to the flange, a frictional force $F_f$, to a steering force $F_s$. The steering force $F_s$ is proportional to the frictional force $F_f$, the proportionality factor being the gear ratio (gr):

$$F_s = F_f \cdot \frac{R_2}{R_1} = F_f \cdot gr$$

The steering roller is steered if the steering force $F_s$ exceeds the combined counteracting forces $F_t$, in this case the parallel component (parallel to the sliding plane) of the resulting force of the belt tension $F_{belt//}$ (not shown, is parallel to $F_{z//}$), the biasing force $F_{bias}$ applied by the spring 113 and the parallel component of the gravitational force, $F_{z//}$. In an equilibrium situation, the steering force equals the total counteracting forces:

$$F_s = F_t$$

$$F_f \cdot gr = F_{belt//} + F_{bias} +_{z//}$$

$$F_f = \frac{F_{belt} \cdot [\sin(\alpha + \beta_1) - \sin(\beta_2 - \alpha)] + F_{bias} + F_z \cdot \sin\alpha}{gr}$$

Minimizing the frictional force required to operate the steering mechanism in an equilibrium situation, is obtained by:

- minimizing pre-tension ($F_{bias}$);
- reducing the slope of the sliding plane ($\alpha$);
- changing the orientation of the gravitational forces by changing the orientation of the steering apparatus (i.e. up-side-down);
- training the belt over a number of rollers in such a way that $\beta_2-\beta_1 \geqq 2\alpha$, which leads to a zero or negative (counteracting) contribution to $F_t$; and/or
- increasing the gear ratio.

However, it should be noted that increasing the gear ratio is restricted to a maximum value. Exceeding this maximum value may lead to an over-sensitive steering mechanism, possibly even leading to excessive wear of the steering mechanism. Therefore the gear ratio is between and including 1 and 10, preferably between and including 1 and 5, most preferably between and including 2 and 3.

Reduction of the frictional tension can be obtained by increasing the contact area between the side portion of the belt and the rotatable flange. One way of doing so is to increase the contact arc by reducing angles $\beta_1$ and $\beta_2$.

Figure 7A:
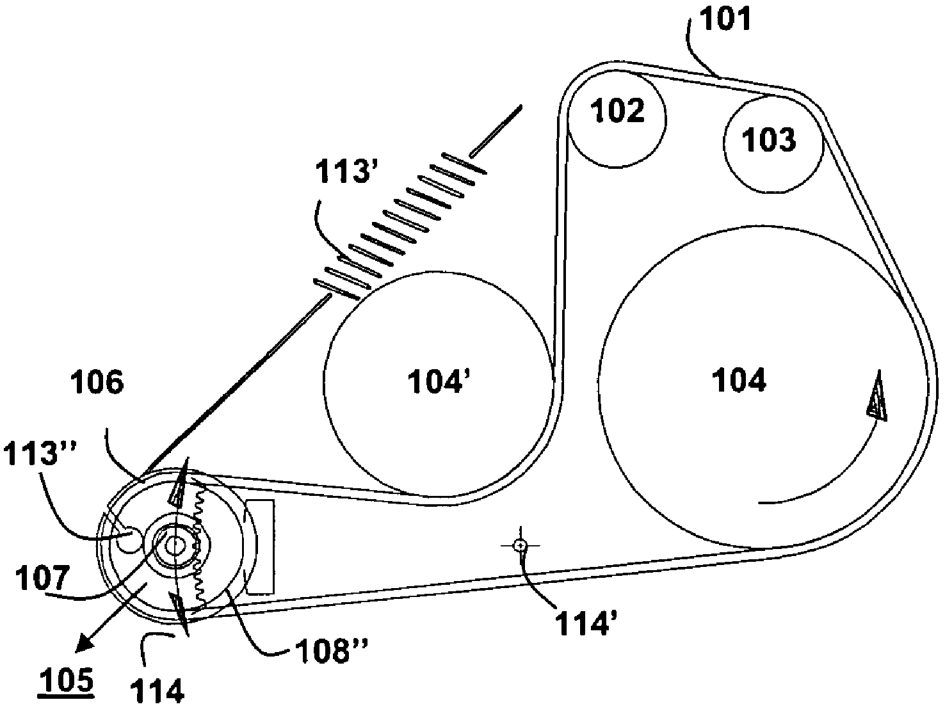
FIG. 7A is a schematic side view of another embodiment of the present invention.
Figure 7B:
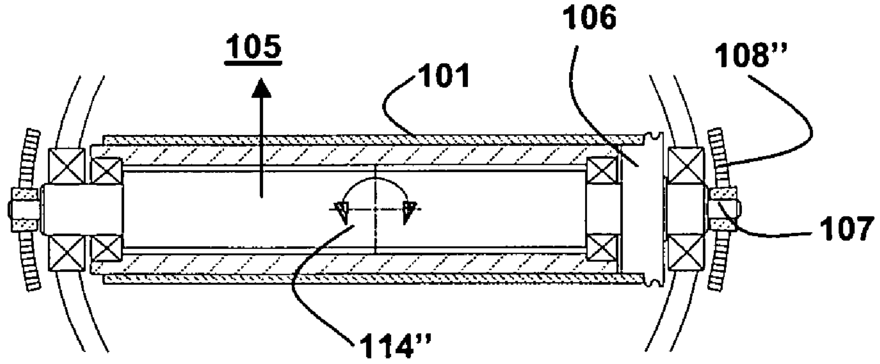
FIG. 7B is a front view of the steering roller of the embodiment of FIG. 7A.

FIGS. 7A and 7B

FIG. 7A schematically shows a side view of another embodiment of the present invention. FIG. 7B shows a front view of the steering roller (105) of the same embodiment.

The apparatus of the embodiment shown in FIG. 7A has four supporting rollers (102, 103, 104 and 104') and a steering roller (105). The apparatus further includes a biasing spring (113), which at one side is attached to the rotatable element (113') and at the other side to a fixed body, for example the frame of the apparatus.

The basic operation of this embodiment of the apparatus of the present invention is the same as previously explained with regard to FIGS. 2 and 3.

When the belt (101) creeps towards the flange (106), the flange starts to rotate upon frictional contact with the lateral end side of the belt. The rotational motion of the flange is transmitted through a gear wheel (107) and a curved gear rack (108") into a tilting motion of the steering roller about a first pivoting point 114". The belt is steered back to its desired path.

The curvature of the gear rack (108") is such that the end side of steering roller at which the rotatable element is arranged moves in a curved way about a second pivoting point (114') as indicated by the double arrow 114.

When the belt touches the flange, the end side of the steering roller moves downwards and the biasing spring 113' is stretched. The belt is steered back to its desired path and the frictional force between the lateral end side of the belt and the flange decreases, upon which the biasing spring pulls back the steering roller to its original position.

Due to the curved motion of the end side of the steering roller about the second pivoting point as described above, this configuration has the advantage that the steering operation is independent of the tension of the belt and hence independent of aging of the belt.

Further advantages of the construction of the apparatus in this embodiment is that due to the pivoting points 114' and 114" and their locations, the weight of the steering roller no longer influences the steering action and a compact apparatus can be constructed.

Figure 8A:
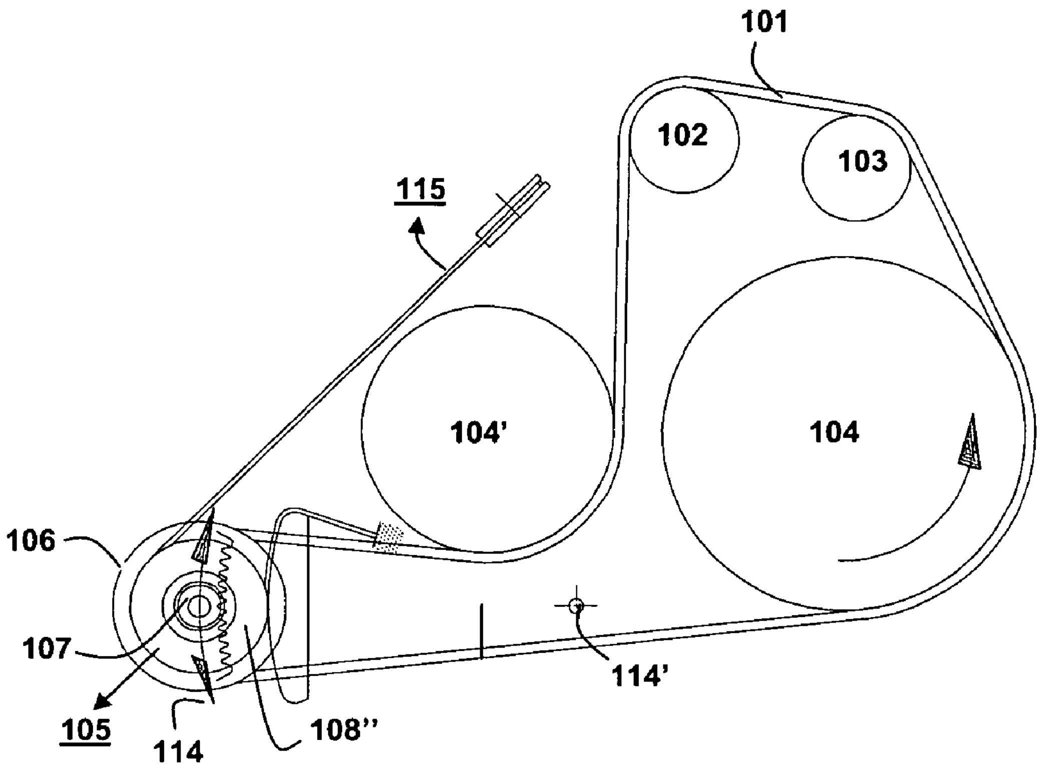
FIG. 8A is a schematic side view of another embodiment of the present invention.
Figure 8B:
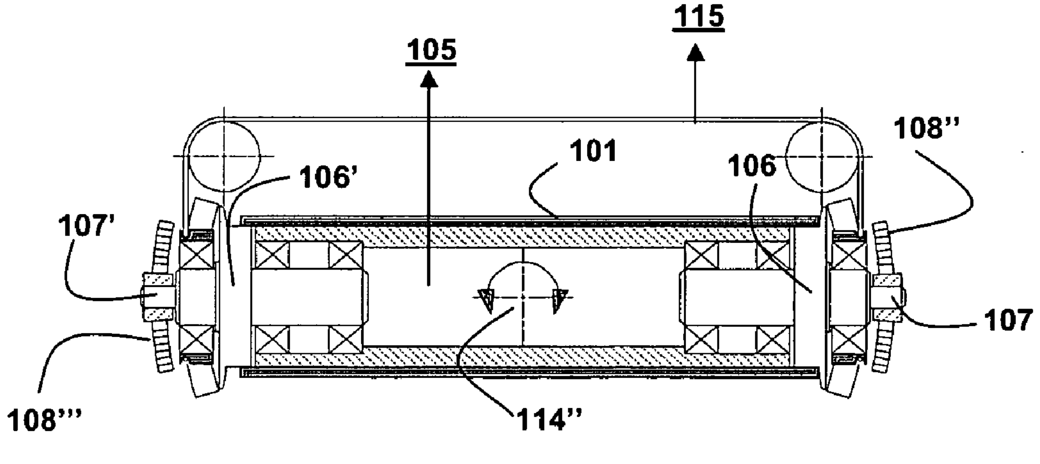
FIG. 8B is a front view of the steering roller of the embodiment of FIG. 8B.

FIGS. 8A and 8B

FIG. 8A schematically shows a side view of another embodiment of the present invention. FIG. 8B shows a front view of the steering roller (105) of the same embodiment.

The apparatus of the embodiment shown in FIG. 8A has four supporting rollers (102, 103, 104 and 104') and a steering roller (105). The apparatus further comprises two steering arrangements at both end sides of the steering roller, both including a flange (106 and 106'), a gear wheel (107 and 107') and a curved gear rack (108" and 108'"). The apparatus also comprises a cable system 115 operatively connecting the first and second steering arrangement.

The basic operation of this embodiment of the apparatus of the present invention is the same as previously explained with regard to FIGS. 2, 3 and 7.

When the belt (101) creeps towards the first flange (106), the first flange starts to rotate upon frictional contact with the lateral end side of the belt. The rotational motion of the flange is transmitted through a first gear wheel (107) and a first curved gear rack (108") into a tilting motion of the steering roller about a first pivoting point 114". The belt is steered back to its desired path.

The curvature of the gear rack (108") is such that the end side of steering roller at which the rotatable element is arranged moves in a curved way about a second pivoting point (114') as indicated by the double arrow 114.

When the belt touches the first flange, the end side of the steering roller moves downwards and the cable system pulls the opposite end side of the steering roller upwards such that the steering roller is rotated about virtual pivoting point 114". A small frictional force between the opposite end portion of the belt and the second rotatable element (106) may offer a biasing force working contrary to the steering force and transmitted through the cable system (115). The belt is steered back to its desired path and the frictional force between the lateral end side of the belt and the first flange decreases, upon which the frictional force between the second flange (106') and the opposite end portion of the belt increases until an equilibrium running path of the belt is reached. With this arrangement, the belt can be steered at both end sides of the steering roller.

Due to the curved motion of the end side of the steering roller about the second pivoting point as described above, this configuration has the advantage that the steering operation is independent of the tension of the belt and hence independent of aging of the belt.

Further advantages of the construction of the apparatus in this embodiment is that due to the pivoting points 114' and 114" and their locations, the weight of the steering roller no longer influences the steering action and a compact apparatus can be constructed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for steering a belt comprising:

a steering roller supporting the belt, the steering roller being rotatable about a first axis and pivotable about a second axis, the second axis being substantial perpendicular to the first axis;

a rotatable element being rotatable about a third axis by a frictional force between a side portion of the belt and the rotatable element, the third axis being substantially parallel to the first axis;

a transmission arranged for converting a rotational motion of the rotatable element about the third axis into a pivoting motion of the steering roller about the second axis, the transmission including a rotatable portion, operatively connected to the rotatable element and having a gear ratio larger than 1; and a pre-tension mechanism, the belt in operation being steered toward the rotatable element by the pre-tension mechanism, wherein the first axis and the third axis coincide.

2. The apparatus for steering a belt according to claim 1, wherein the rotatable element is freely rotatable about the third axis.

3. The apparatus for steering a belt according to claim 1, wherein a dimension of at least a portion of the rotatable element extending from the third axis to the perimeter of the rotatable element, perpendicular to the third axis, exceeds a radius of the steering roller.

4. The apparatus for steering a belt according to claim 1, wherein the rotatable element comprises a flange.

5. The apparatus for steering a belt according to claim 1, wherein the rotatable element is arranged at a first axial end portion of the steering roller.

6. The apparatus for steering a belt according to claim 5, wherein the transmission is arranged at the first axial end portion of the steering roller.

7. The apparatus for steering a belt according to claim 1, wherein the pre-tension mechanism inducing a pivoting motion of the steering roller about the second axis in a direction opposite to the direction in which the steering roller is pivotable by the transmission induced by the frictional force between the side portion of the belt and the rotatable element.

8. The apparatus for steering a belt according to claim 1, wherein the transmission includes a gear wheel connected to the rotatable element and a gear rack, the gear rack being arranged such that the steering roller is pivotable about the second axis.

9. The apparatus for steering a belt according to claim 1, wherein the transmission includes a coiling device arranged such that the steering roller is pivotable about the second axis.

10. The apparatus for steering a belt according to claim 9, wherein the coiling device includes an elongated flexible member.

11. The apparatus for steering a belt according to claim 10, wherein the elongated flexible member is selected from the group comprising ribbon, chain, thread and string.

12. An apparatus for steering a belt comprising:

a steering roller supporting the belt, the steering roller being rotatable about a first axis and pivotable about a second axis, the second axis being substantial perpendicular to the first axis;

a rotatable element being rotatable about a third axis by a frictional force between a side portion of the belt and the rotatable element, the third axis being substantially parallel to the first axis; and a transmission arranged for converting a rotational motion of the rotatable element about the third axis into a pivoting motion of the steering roller about the second axis, the transmission including a rotatable portion, operatively connected to the rotatable element and having a gear ratio larger than 1, wherein the transmission is arranged at the first axial end portion of the steering roller, and wherein the transmission is arranged at a second opposite axial end portion of the steering roller.

13. An imaging system comprising:

an apparatus for steering a belt, said apparatus comprising:

a steering roller supporting the belt, the steering roller being rotatable about a first axis and pivotable about a second axis, the second axis being substantial perpendicular to the first axis;

a rotatable element being rotatable about a third axis by a frictional force between a side portion of the belt and the rotatable element, the third axis being substantially parallel to the first axis;

a transmission arranged for converting a rotational motion of the rotatable element about the third axis into a pivoting motion of the steering roller about the second axis, the transmission including a rotatable portion, operatively connected to the rotatable element and having a gear ratio larger than 1; and a pre-tension mechanism, the belt in operation being steered toward the rotatable element by the pre-tension mechanism, wherein the first axis and the third axis coincide.

14. A method for steering a belt in a steering mechanism, the steering mechanism comprising:

a steering roller supporting the belt, the steering roller being rotatable about a first axis and pivotable about a second axis, the second axis being substantial perpendicular to the first axis;

a rotatable element being rotatable about a third axis by a frictional force between a side portion of the belt and the rotatable element, the third axis being substantially parallel to the first axis;

a transmission arranged for converting a rotational motion of the rotatable element about the third axis into a pivoting motion of the steering roller about the second axis, the transmission including a rotatable portion, operatively connected to the rotatable element and having a gear ratio larger than 1; and a pre-tension mechanism, the belt in operation being steered toward the rotatable element by the pre-tension mechanism, wherein the first axis and the third axis coincide, said method comprising the steps of:

advancing the belt over the steering roller;

inducing a rotational motion of the rotatable element, by frictional forces between a side portion of the belt and the rotatable element; and pivoting the steering roller about the second axis, via the transmission, such that the belt is steered to an equilibrium lateral position.

* * * * *